United States Patent
Cardno et al.

(10) Patent No.: US 9,760,248 B2
(45) Date of Patent: Sep. 12, 2017

(54) DATA VISUALIZATION CONFIGURATION SYSTEM AND METHOD

(75) Inventors: Andrew John Cardno, San Diego, CA (US); Guillermo Quiros Manser, Churton Park (NZ)

(73) Assignee: New BIS Safe Luxco S.à.r.l., Luxembourg (LU)

( * ) Notice: Subject to any disclaimer, the term of this patent is extended or adjusted under 35 U.S.C. 154(b) by 146 days.

(21) Appl. No.: 14/006,834

(22) PCT Filed: Mar. 23, 2012

(86) PCT No.: PCT/NZ2012/000044
§ 371 (c)(1),
(2), (4) Date: Nov. 26, 2013

(87) PCT Pub. No.: WO2012/128650
PCT Pub. Date: Sep. 27, 2012

(65) Prior Publication Data
US 2014/0075346 A1    Mar. 13, 2014

Related U.S. Application Data

(60) Provisional application No. 61/466,805, filed on Mar. 23, 2011.

(51) Int. Cl.
*G06F 3/048* (2013.01)
*G06F 3/0482* (2013.01)
*G06F 9/44* (2006.01)

(52) U.S. Cl.
CPC .......... *G06F 3/0482* (2013.01); *G06F 9/4443* (2013.01)

(58) Field of Classification Search
None
See application file for complete search history.

(56) References Cited

U.S. PATENT DOCUMENTS 5,642,511 A * 6/1997 Chow et al. .................. 717/105
2010/0318583 A1* 12/2010 Cohen ............... G06F 17/30392
707/805

FOREIGN PATENT DOCUMENTS

WO    WO 2009/154484    12/2009

OTHER PUBLICATIONS

Microsoft Excel User's Guide Version 5.0, Microsoft Corporation, 1993, Chapter 15-19.
International Search Report for International Application No. PCT/NZ2012/000044 mailed Jun. 8, 2012 (2 pages).

* cited by examiner

*Primary Examiner* — William Trapanese
(74) *Attorney, Agent, or Firm* — Merchant & Gould P.C.

(57) ABSTRACT

In a data visualization configuration system, a method of creating one or more modifiable data interface objects that are used to represent data values for visualization in a graphical representation, the method comprising the steps of: detecting an instruction to create a new modifiable data interface object from a list of parent modifiable data interface objects, creating a proxy modifiable data interface object as the new modifiable data interface object for each parent modifiable data interface object associated with the instruction, and enabling the proxy modifiable data interface object to be available for modification, where the proxy modifiable data interface object refers to its associated parent modifiable data interface object.

24 Claims, 10 Drawing Sheets

FIGURE 7

DATA VISUALIZATION CONFIGURATION SYSTEM AND METHOD

This application is a National Stage Application of PCT/NZ2012/000044, filed 23 Mar. 2012, which claims benefit of Ser. No. 61/466,805, filed 23 Mar. 2011 in the United States and which application are incorporated herein by reference. To the extent appropriate, a claim of priority is made to each of the above disclosed applications.

FIELD OF THE INVENTION

The present invention relates to an improved data visualization configuration system and method. In particular, the present invention relates to an improved data visualization configuration system and method for creating modifiable data interface objects by creating proxy data interface objects.

BACKGROUND

Known configuration systems for data visualization systems enable a user to select any data records for use in the visualization with minimal restraint.

Further, when a user wishes to update which data records are to be used in a visualization, it is required that each data record interface definition is updated individually by the user. A data record interface definition is considered to be a way of getting access to the underlying data, i.e. an interface between the data and the user. For example, metrics and dimensions associated with the data record may be updated by the user. Further, as new data visualizations are created, new and independent data record interfaces are created for that data visualization.

An object of the present invention is to provide an improved configuration system for creating data visualization documents.

A further object of the present invention is to provide an improved configuration system that maintains the integrity of data interface objects for data visualization documents.

Each object of the present invention is to be read disjunctively with the object of at least providing the public with a useful choice.

The present invention aims to overcome, or at least alleviate, some or all of the afore-mentioned problems.

SUMMARY OF THE INVENTION

It is acknowledged that the terms "comprise", "comprises" and "comprising" may, under varying jurisdictions, be attributed with either an exclusive or an inclusive meaning. For the purpose of this specification, and unless otherwise noted, these terms are intended to have an inclusive meaning—i.e. they will be taken to mean an inclusion of the listed components which the use directly references, and possibly also of other non-specified components or elements.

According to one aspect, the present invention provides, in a data visualisation configuration system, a method of creating one or more modifiable data interface objects that are used to represent data values for visualization in a graphical representation, the method including the steps of: detecting an instruction to create a new modifiable data interface object from a list of parent modifiable data interface objects, creating a proxy modifiable data interface object as the new modifiable data interface object for each parent modifiable data interface object associated with the instruction, and enabling the proxy modifiable data interface object to be available for modification, where the proxy modifiable data interface object refers to its associated parent modifiable data interface object.

BRIEF DESCRIPTION OF THE DRAWINGS

Embodiments of the present invention will now be described, by way of example only, with reference to the accompanying drawings, in which:

FIGS. 6, 7 & 8 show various screen shots displayed by a configuration system according to an embodiment of the present invention;

DETAILED DESCRIPTION OF THE INVENTION

First Embodiment

Figure 1:
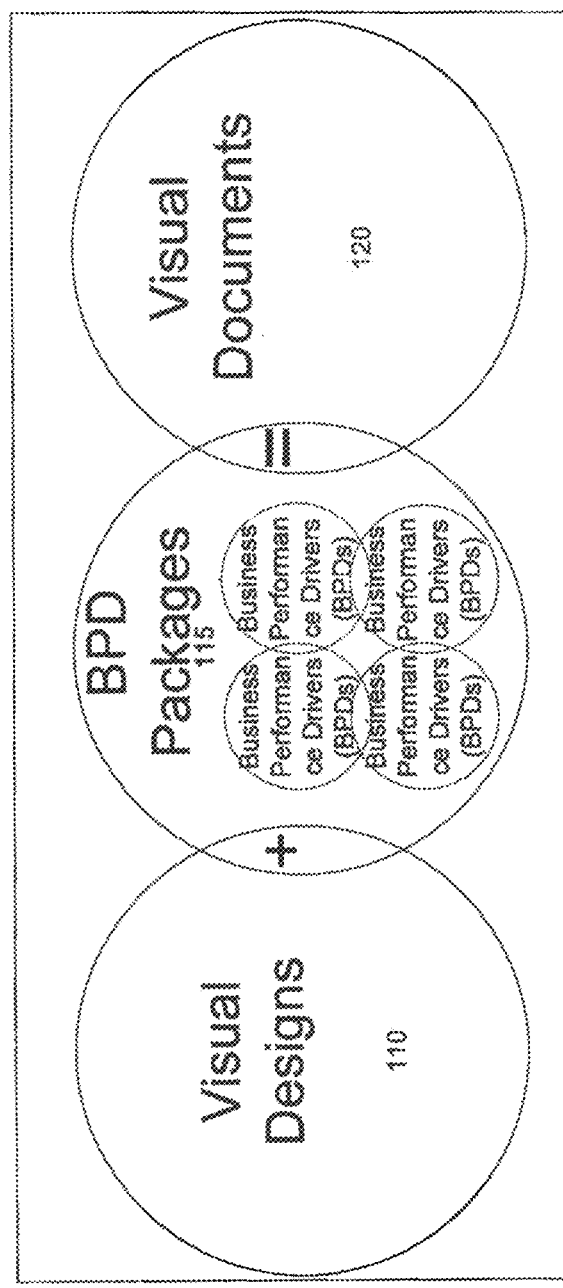
FIG. 1 shows a diagrammatic representation of the key terms used by the configuration system according to an embodiment of the present invention.

Embodiments of the present invention are described herein with reference to a data visualization configuration system adapted or arranged to perform configuration of a data visualization system.

The following described invention is suitable for use in conjunction with a data visualization system and data visualization methods, for example as described in METHODS, APPARATUS AND SYSTEMS FOR DATA VISUALISATION AND RELATED APPLICATIONS earlier filed by the applicant and published as WO2009/154484, which is hereby incorporated by reference.

In summary, the configuration system includes at least a processor, one or more memory devices or an interface for connection to one or more memory devices, input and output interfaces for connection to external devices in order to enable the system to receive and operate upon instructions from one or more users or external systems, a data bus for internal and external communications between the various components, and a suitable power supply. Further, the system may include one or more communication devices (wired or wireless) for communicating with external and internal devices, and one or more input/output devices, such as a display, pointing device, keyboard or printing device.

The processor is arranged to perform the steps of a program stored as program instructions within the memory device. The program instructions enable the various methods of performing the invention as described herein to be performed. The program instructions may be developed or implemented using any suitable software programming language and toolkit, such as, for example, a C-based language. Further, the program instructions may be stored in any suitable manner such that they can be transferred to the memory device or read by the processor, such as, for example, being stored on a computer readable medium. The computer readable medium may be any suitable medium, such as, for example, solid state memory, magnetic tape, a compact disc (CD-ROM or CD-R/W), memory card, flash memory, optical disc, magnetic disc or any other suitable computer readable medium.

The system is arranged to be in communication with external data storage systems or devices in order to retrieve the relevant data, as described below.

The system is further arranged to be in communication with a data visualization system, such as the type described in WO2009/154484.

It will be understood that the system herein described includes one or more elements that are arranged to perform the various functions and methods. The following portion of the description is aimed at providing the reader with an example of a conceptual view of how various modules and/or engines that make up the elements of the system may be interconnected to enable the functions to be implemented. Further, the following portion of the description explains in system related detail how the steps of the herein described method may be performed. The conceptual diagrams are provided to indicate to the reader how the various data elements are processed at different stages by the various different modules and/or engines.

It will be understood that the arrangement and construction of the modules or engines may be adapted accordingly depending on system and user requirements so that various functions may be performed by different modules or engines to those described herein, and that certain modules or engines may be combined into single modules or engines.

It will be understood that the modules and/or engines described may be implemented and provided with instructions using any suitable form of technology. For example, the modules or engines may be implemented or created using any suitable software code written in any suitable language, where the code is then compiled to produce an executable program that may be run on any suitable computing system. Alternatively, or in conjunction with the executable program, the modules or engines may be implemented using any suitable mixture of hardware, firmware and software. For example, portions of the modules may be implemented using an application specific integrated circuit (ASIC), a system-on-a-chip (SoC), field programmable gate arrays (FPGA) or any other suitable adaptable or programmable processing device.

The methods described herein may be implemented using a general purpose computing system specifically programmed to perform the described steps. Alternatively, the methods described herein may be implemented using a specific computer system such as a data visualization configuration computer, where the computer has been specifically adapted to perform the described steps using specific data captured from an environment associated with a particular field. For example, the data visualization system being configured by the configuration system may be implemented using a database query computer, a graphical analysis computer, a retail environment analysis computer, a gaming data analysis computer, a manufacturing data analysis computer, a business intelligence computer, a social network data analysis computer, etc.

The present application is directed towards a configuration system and associated method that aids a user at the implementation stage of commissioning a data visualization system. The herein described configuration system enables a user to easily set up the interconnections and operational instructions that apply to the various databases, tables and data objects used by the data visualization system in order to enable the data visualization system to create meaningful data visualizations.

To provide context, the main components of a suitable data visualization system are now described. Four key terms (or concepts) are used to form the foundation of the data visualization system description:

The four key terms are:
Business Performance Drivers (BPD)
BPD Packages
Visual Designs
Visual Documents The key terms are defined as follows:
Business Performance Drivers (BPDs): A Business Performance Driver (BPD) is a business metric used to quantify a business objective. For example, turnover, sales. BPDs are Facts (sometimes referred to as measures). Facts are data items that can be counted. For example, Gross Sales; Units Sold.

BPDs comprise of:
1. Measures: Data items that can be counted. For example, Gross Sales; Units Sold.
2. Dimensions: Data items that can be categorized. For example, Gender; Locations.
3. Restrictions can be applied to BPDs. These filter the data included. For example a restriction of 'State="CA"' may be specified to only include data for California.
4. Normalizations can be applied to BPDs. These specify (or alter) the time period the BPD refers to. For example—Daily Units Sold, Monthly Profit.

The combination of BPDs, Restrictions and Normalizations provides the flexibility to create many ways of looking at data without requiring extensive definition effort.

In other words a Business Performance Driver (BPD) is a 'measure' that can be normalized. Measures are data items that can be counted. For example, Gross Sales; Units Sold. BPDs might be displayed on visualizations. For example, Revenue earned per store on a map. Restrictions and/or Normalizations could be applied to a BPD. The following table provides examples of these:

| Scenario | Business Example |
|---|---|
| BPD (no normalization or restriction) | Revenue |
| BPD with restriction | Revenue earned in the state of California |
| BPD with normalization | Revenue earned in week 1 of 2008 |
| BPD with restriction and normalization | Revenue earned in the state of California in week 1 of 2008 |

Examples of a BPD in the Gaming Industry include the theoretical win per gaming position, the average number of rooms cleaned by housekeepers during a single shift, average daily revenue for hotel rooms, and the number of restaurant covers per square foot.

Examples of a BPD in the Telecommunications Industry may include maximizing the number of revenue text messages sent and received during for example a single month, improving call dropped rates, reducing network interconnect rates, maximizing the average profitability of transactions over a period of time, or the average ratio of high profit items to low profit items within the telecommunications product mix available to consumers.

BPD Packages: A BPD Package is made up from a set of related BPDs. This relationship (between a BPD Package and its BPDs) is defined using metadata.

BPD Packages can be thought of as the Visual Document's vocabulary.

Visual Designs: Visual Designs are a classification of the different types of visualizations that a user may choose. Within each Visual Design, there are a number of visualizations. For example, the 'spatial' category can have retail store location maps or geographical location maps.

The software solution allows users to select one visualization (one visual form within a Visual Design category) to create a Visual Document.

Visual Document: A Visual Document contains visual representations of data. Access to the data used to construct the visual representation is in many ways analogous to a textual document.

A Visual Document is constructed by applying BPD data to a specific Visual Design. It is designed to illustrate at least one specific point (using the visualization), supports the points made with empirical evidence, and may be extended to provide recommendations based on the points made. The Visual Document is a deliverable to the user.

| | |
|---|---|
| Dimensions | Dimensions are data items that can be categorized. For example, Gender; Locations. Dimensions might be displayed on visualizations. For example product categories on a shop floor. |
| Fact | See Business Performance Drivers (BPDs) |
| Measure | See Business Performance Drivers (BPDs) |
| Normalizations | Can be applied to BPDs. These specify (or alter) the time period the BPD refers to. For example - Daily Units Sold, Monthly Profit. The combination of BPDs, Restrictions and Normalizations provides the flexibility to create many ways of looking at data without requiring extensive definition effort. Refer to definition of BPDs for examples. |
| Restrictions | Can be applied to BPDs or Dimensions. These filter the data included. For example a restriction of 'State = "CA"' may be specified to only include data for California. A BPD or Dimension could be restricted by Compound Statements (series of restrictions using AND/OR statements). For example, Revenue from all stores where state = California AND units sold >200 units. |

The key terms are set out diagrammatically in FIG. 1. Visual designs 110 are individual visualization techniques. One or more are applied to visualize BPD packages 115 to create visual documents 120.

Figure 2:
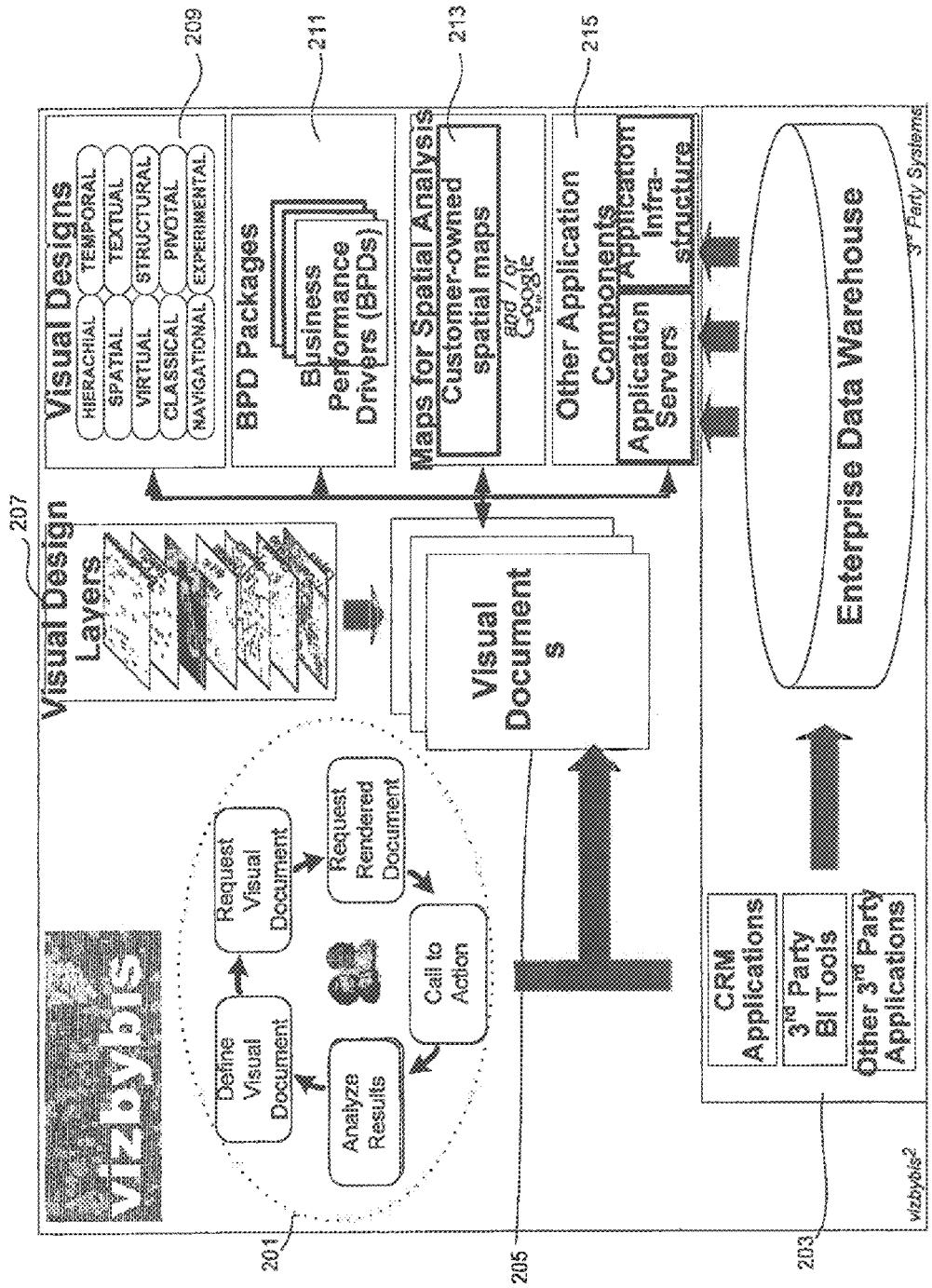
FIG. 2 shows a system block diagram summary of a data visualization system for use according to an embodiment of the present invention.

A data visualization system is summarized in FIG. 2.

The system identifies user tasks 201 in the form of defining visual documents, requesting visual documents, requesting rendered documents, calls to action, and analyzing results. These tasks are then detected by the system in conjunction with other systems 203, which include CRM applications, third party Business Intelligence (BI) Tools and other third party applications, all of which may access data stored in an enterprise data warehouse (EDW). The visual design layer concept 207 may be utilized within the visual documents 205. The creation of the visual documents is made in conjunction with a number of different defined visual design types 209, BPD packages 211, spatial analysis maps 213 and other application components 215, such as application servers and application infrastructure.

A Visual Document contains visual representations of data. Access to the data used to construct the visual representation is in many ways analogous to a textual document. It is constructed by applying Business Performance Driver(s) (BPD) data to a specific Visual Design (Visual Designs are grouped into ten classifications).

A Visual Document is designed to illustrate at least one specific point (using the visualization), support the points made with empirical evidence, and may be extended to provide recommendations based on the points made. The Visual Document is the actual deliverable from the software to the software user. Visual Documents may be stored, distributed or analyzed later, as needed.

The Visual Document is fed by data and a metadata database that stores definitions of BPDs—the BPDs are the focus of the Visual Document. A Business Performance Driver is a business metric used to quantify a business objective. Examples include, gross sales or units sold. For instance, the Visual Document may be used to graphically depict the relationship between several BPDs over time.

The data visualization system described thus enables various methods to be performed. For example, data is transformed into visually interpretable information. The visually interpretable information is in the form of visual representations that are placed within one or more visual documents.

Figure 3:
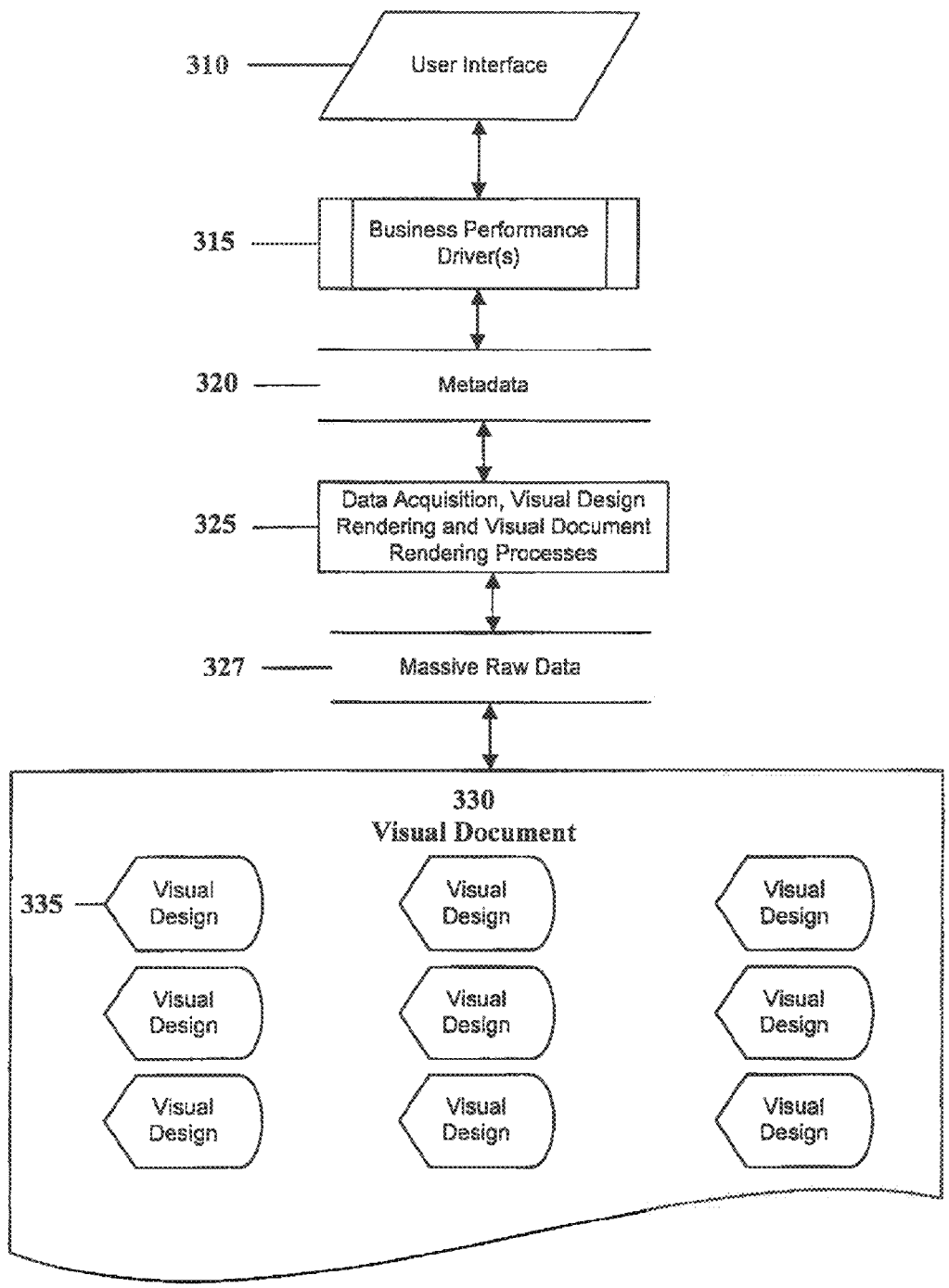
FIG. 3 shows a data flow diagram for use according to an embodiment of the present invention.

FIG. 3 shows a general data flow diagram for the described system.

The User Interface 310 allows the user to define BPD's 315 in terms of raw data 327, which become the focus of the Visual Document 330.

Further, the User Interface 310 allows the user, through automated expert help, to create the Metadata 320, the most appropriate Visual Designs 335 that make up the Visual Document 325 in order to provide detailed analysis of data related to the BPD 315. The data acquisition, visual design rendering and visual document rendering processes utilize massive amounts of raw data 327.

The Metadata 320 is used by the Processes 325 to optimize the acquisition of the appropriate Data 327, processing of the data into useful information, and to optimize the creation and rendering of the Visual Designs 335 and the Visual Document 330 that contains them.

Figure 4:
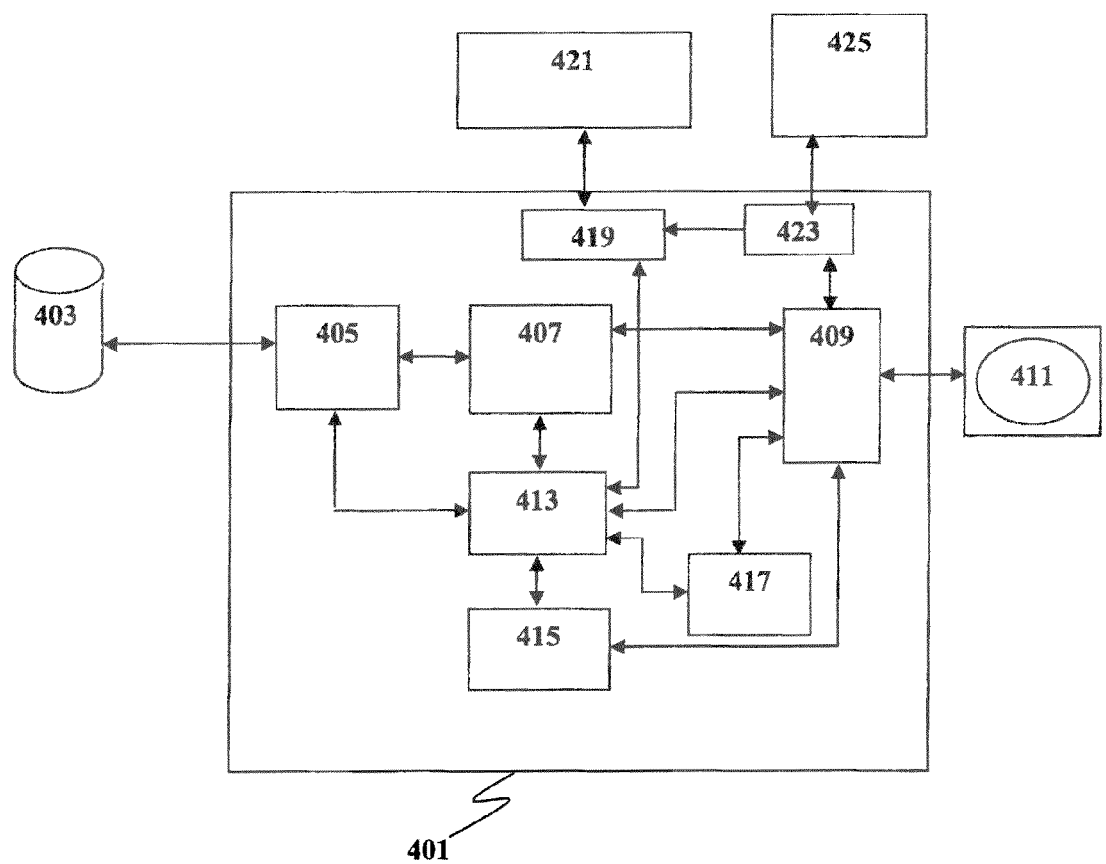
FIG. 4 shows a conceptual system diagram of a configuration system according to an embodiment of the present invention.

FIG. 4 shows a conceptual data visualization configuration system 401 block diagram. A data storage module 403 is in communication with a data retrieval module 405. The data retrieval module is configured to retrieve or read data from the data storage module, which is in communication with the configuration system 401.

The data storage module may be any suitable type of data storage system. For example, it may be an enterprise data warehouse (EDW), a data mart, a database, a storage array or any other suitable device or group of devices that can store data for later retrieval. Further, the data storage module may be a cache memory used to temporarily store incoming data captured in real time. For example, the incoming data may be streaming data.

A data connection module 407 is in communication with the data retrieval module. The data connection module is arranged to connect (or link) data in the data storage module to the configuration system, as will be explained in more detail below. The user instructs the configuration system to link data based on selections made by the user via a user interface 409. The user interface may use any suitable mechanism for displaying instructions and enabling a user to control how the configuration system operates. For example, according to this embodiment, the user interface operates by arranging information to be displayed using the Adobe™ Flash™ player software. The data connection information is subsequently displayed via the user interface on a display module 411.

The linked data is developed into a schema for use by the configuration system when creating visual documents by a schema module 413. The schema module retrieves the relevant table and field data from the data storage module via the data retrieval module based on instructions provided to the data connection module from the user via the user interface. That is the user selects via the user interface which tables and field data are to be linked and arranged into the configuration system schema. The developed schema is displayed on the display module via the user interface.

The BPDs and dimensions for the schema are added and/or modified using a data interface object module in the form of a BPD and dimension module 415, which is in communication with the schema module 413. The BPD and dimension module receives instructions from the user via the user interface, where the instructions cause the module to create, modify or delete BPDs and dimensions within the schema developed by the schema module. The newly created or modified BPDs and dimensions are subsequently displayed on the display module via the user interface.

A join and aggregate module 417 is arranged to be in communication with the schema module and user interface to enable the user to define joins and aggregates based on the instructions provided by the user via the user interface.

A visualization document module 419 is in communication with a template library 421 and the user interface. The visualization document module retrieves a requested template from the template library based on the user's instructions received via the user interface. The visualization document module also receives details of the status of a visualization document from a request module 423. The request module is in communication with the main data visualization system 425 which creates the data visualizations.

Figure 5:
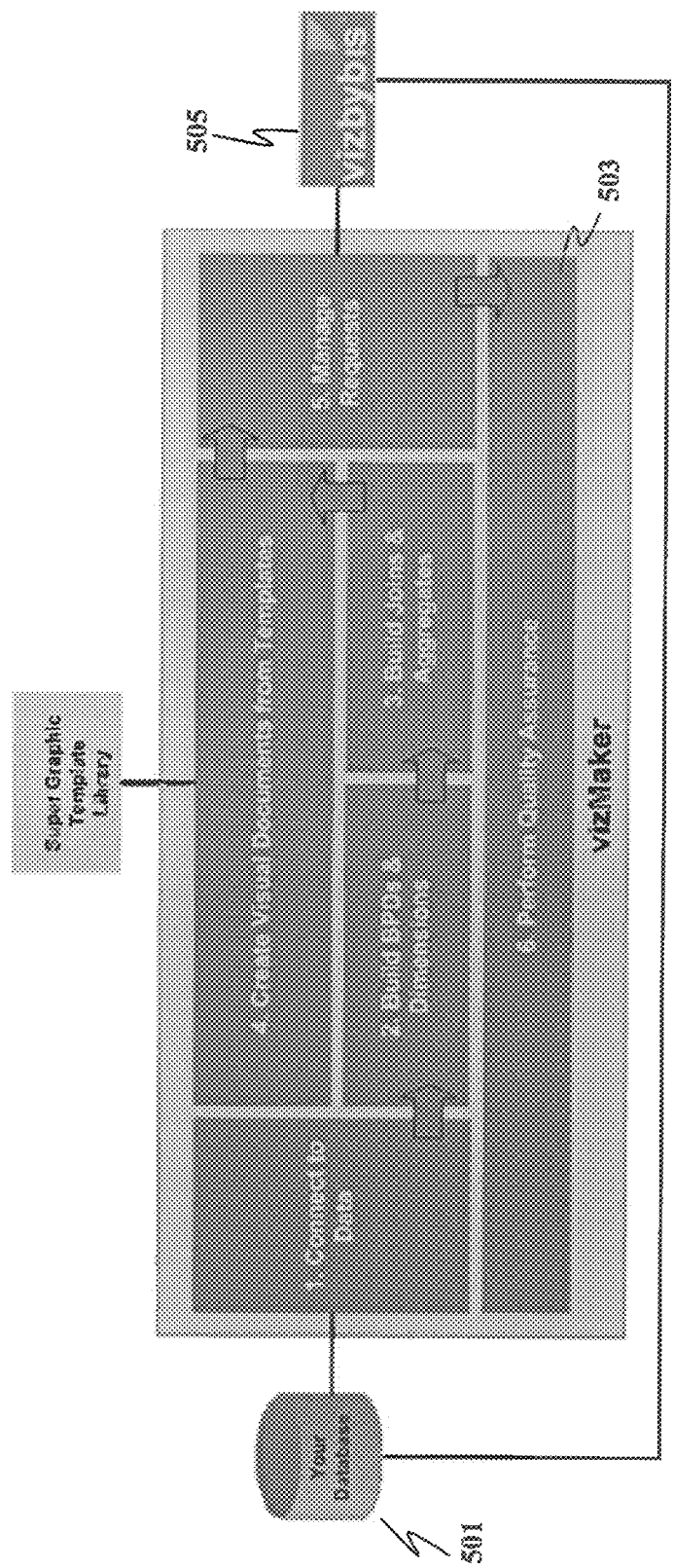
FIG. 5 shows a conceptual diagram of various steps that are taken by a configuration system according to an embodiment of the present invention.

FIG. 5 shows a conceptual diagram of various steps that are taken by the data visualization configuration system during the configuration stages in order to create visual documents.

501 is the customer's database from where the data being visualized is retrieved. The data visualization configuration system 503 and the data visualization system 505 are in communication with the database to enable access to the data therein.

Connect to the Data

As a first step, the data visualization configuration system 503 connects to the data store (data base 501). A list of databases that are available from the data store is requested by the configuration system, the data store returns the list to the configuration system.

The configuration system may then connect to any of the available databases, view the database schema, and enable a user to select and link to the required tables and fields in the database. This effectively creates a schema that the configuration system may use.

When creating a new schema for use by the configuration system, a new data interface object is created. This object is provided with a name to identify the object. A description is provided to identify the database that is associated with the object. Also, access availability to the object is defined as well as the owner of the object.

A system generated date for the object is also included to identify when the database was last modified.

Finally, a Database name and Data source name are provided to match the external database. The Database name and Data source name must be an exact match to the name of the external database, and the JNDI (Java Naming and Directory Interface) name used within WebSphere or JBoss, for example.

The configuration system may provide a list of any tables previously selected and linked to the database.

The configuration system includes a schema wizard that controls the schema module. The schema wizard is a program interface module that is used by the user to retrieve a list of tables and associated fields from the database that have previously been connected to the system using the above steps. Any of the tables in the list may then be selected by a user via the user interface. The configuration system detects this selection and links the selected table and associated fields to the configuration system. A list of the fields within a table may be viewed by selecting the appropriate table name. Multiple tables may also be selected to view the fields in multiple tables.

Upon confirming the selection of tables, a name may be allocated to the table for use by the configuration system. The normalization options for the table may also be updated if required. The tables for use by the configuration system may then be created.

After the tables have been created, the values in the table and the field variables may be viewed and updated if required.

Build BPDs and Dimensions

The configuration system includes a BPD and Dimensions wizard, which is a program interface module that controls the BPD and Dimension module to enable a user to create new BPDs & dimensions and modify existing BPDs and dimensions. BPDs are modifiable metric records, and dimensions are modifiable dimension records. Each may be considered a data interface object.

For example, new BPDs and/or dimensions may be created by the BPD and Dimension module when a user uses the BPD and Dimensions wizard to create a new visualization document from a template. Also, new BPDs and/or dimensions may be created within an existing visualization document to enhance an existing visualization document. Further, existing BPDs and/or dimensions in an existing visualization document may be modified to modify the current visualization document.

Build Joins and Aggregates

The configuration system provides a mechanism that enables a user to create spatial and relational joins as is known in SQL. By selecting the Joins option, a list of already available joins is displayed on the screen for the user to view. The user may create a new join by selecting the "Add" button. The user then specifies the join criteria such as the join name, description, join type, fields, predicates and operators.

The join type may be, for example, undefined, an inner join, an outer join, a left join and a right join.

An undefined join is the default when creating a join. It must be updated to one of the other defined join types. An inner join returns rows for which there is data in both tables. An outer join returns rows in both tables, a matching record is not required. A left join returns all rows from the left table, even if there are no matches in the right table. A right join returns all rows from the right table, even if there are no matches in the left table.

The operator options include, equal, not equal, greater than, less than, greater than or equal, less than or equal, ST contains, ST crosses, ST equals, ST disjoint & ST within. These are described in more detail below.

EQUAL: x is equal to y—returns a TRUE (if x is equal to y) or FALSE (if x is not equal to y).

NOT_EQUAL: The Not Equal operator tells the program to evaluate an expression (x< >y) and return a TRUE (if x is not equal to y) or FALSE (if x is equal to y).

GREATER_THAN: x is greater than y.

LESS_THAN: x is less than or equal to y.

GREATER_THAN_OR_EQUAL: x is greater than or equal to y.

LESS_THAN_OR_EQUAL: x is less than or equal to y.

ST_Contains: Used to determine whether one geospatial geometry is completely contained by another geometry.

ST_Crosses: Used to determine whether one geometry crosses another.

ST_Equals: Returns a value of 1 (one) if two geometries are identical.

ST_Disjoint: Takes two geometries as input parameters and returns 1 if the given geometries do not intersect. If the geometries do intersect, then 0 (zero) is returned.

ST Within: Determines whether one geometry is completely within another geometry.

Create Visual Documents from Templates

The configuration system is also arranged to enable visual documents from a number of different templates to be created. A template wizard lists the available templates for the user to select for use in the visual document being configured. These templates are grouped together in template groups, which include inspatial, pivotal, quartal, spatial, temporal and compositional groups.

The inspatial template group is specifically adapted to create a visual representation of data on an operational floor map. The pivotal template group is specifically adapted to create a visual representation of data in a cross-tabular format. The quartal template group is specifically adapted to create a visual representation of data in a quadrant style format. The spatial template group is specifically adapted to create a visual representation of data on a geographical context map. The temporal template group is specifically adapted to create a visual representation of data in a spiral calendar format. The compositional template group is specifically adapted to create a visual representation of data that can be compared as two dimensions. It will be understood that more templates may be provided for use by the configuration system.

When activating the template wizard a list of the available template groups is provided. By selecting a specific template group, any existing visual documents in that group are displayed along with all available templates associated with that group. The user may either modify an existing visual document or create a new visual document from an existing template.

Manage Requests

The configuration system provides a status list of visual document tasks that the system is performing. For example, the configuration system identifies whether the visual document is currently being rendered, has been rendered or failed to render.

A list of visual documents recently created is provided along with a visual marker that identifies the status of that visual document. A green flag indicates that the visual document has completed the rendering stage, a yellow flag indicates that the visual document is in the process of being rendered and a red flag indicates a render failure.

If a visual document has failed to render, the configuration system identifies the reasons for the failure and lists these for the user to view.

Perform Quality Assurance

The data visualization system and data visualization configuration system are very powerful database query and data visualization tools. They provide the user with significant flexibility as to what they can query and how they present the results. It is important that the tool is used correctly and with the appropriate safeguards. Although the configuration tool is arranged to only provide options to the user that are relevant to the task selected by the user in order to minimize error, a series of check lists are also provided to aid the user when configuring the system.

The following provides a more detailed description of how the configuration system builds and modifies BPDs and Dimensions.

Figure 6:
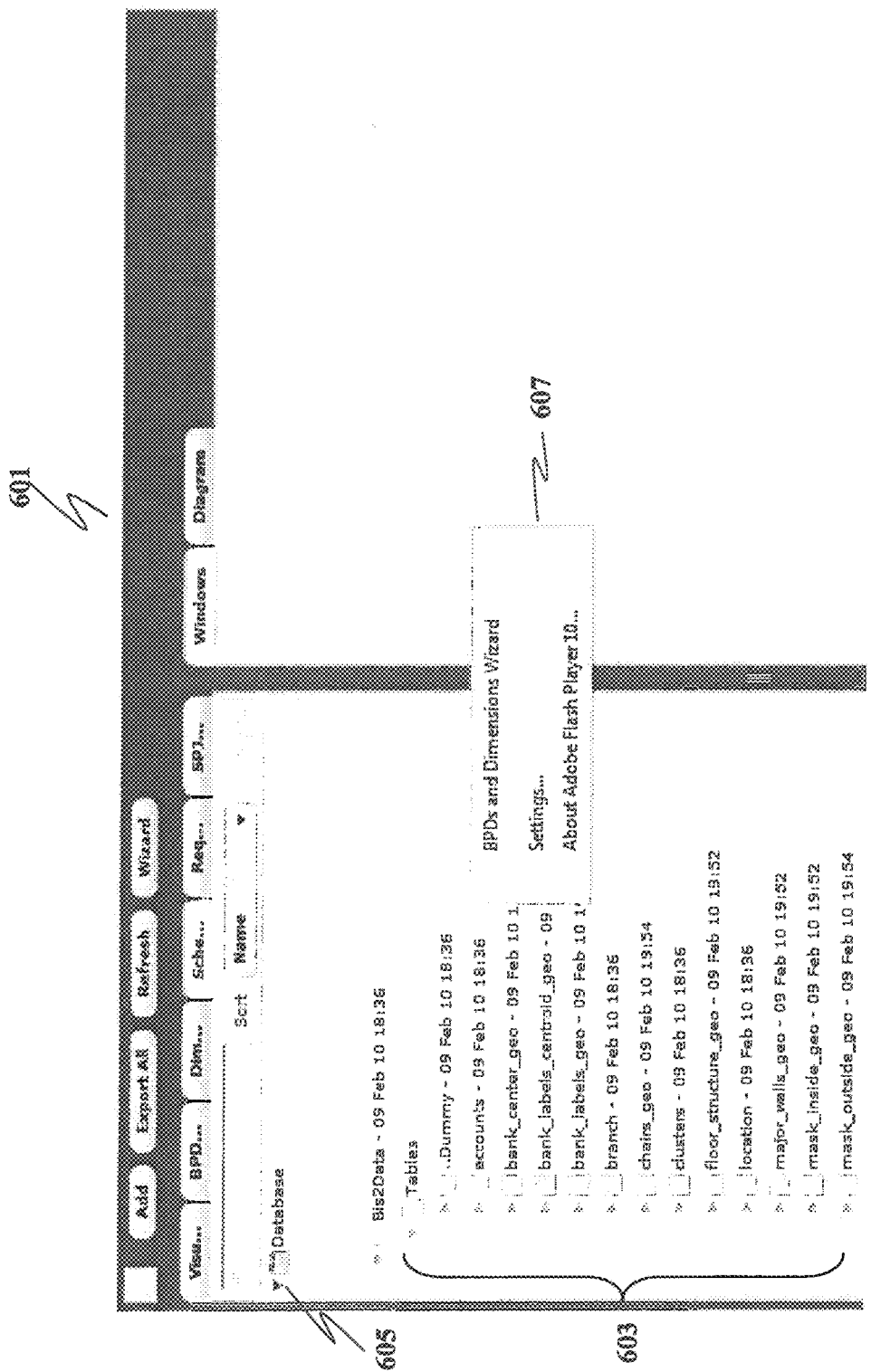

FIG. 6 shows a screenshot 601 of a display created by the configuration system. The screen shot includes a list of tables 603 from a database 605 that has previously been linked to the configuration system as explained above. The user selects an appropriate table from the list, such as table "accounts—9 Feb 10 18:36", by right clicking on the table listing. This action causes an option window 607 to appear next to the selected table. One option provided is to activate the BPD and Dimensions Wizard. Upon selecting the wizard option, the BPD and Dimensions wizard is opened as described below.

Figure 7:
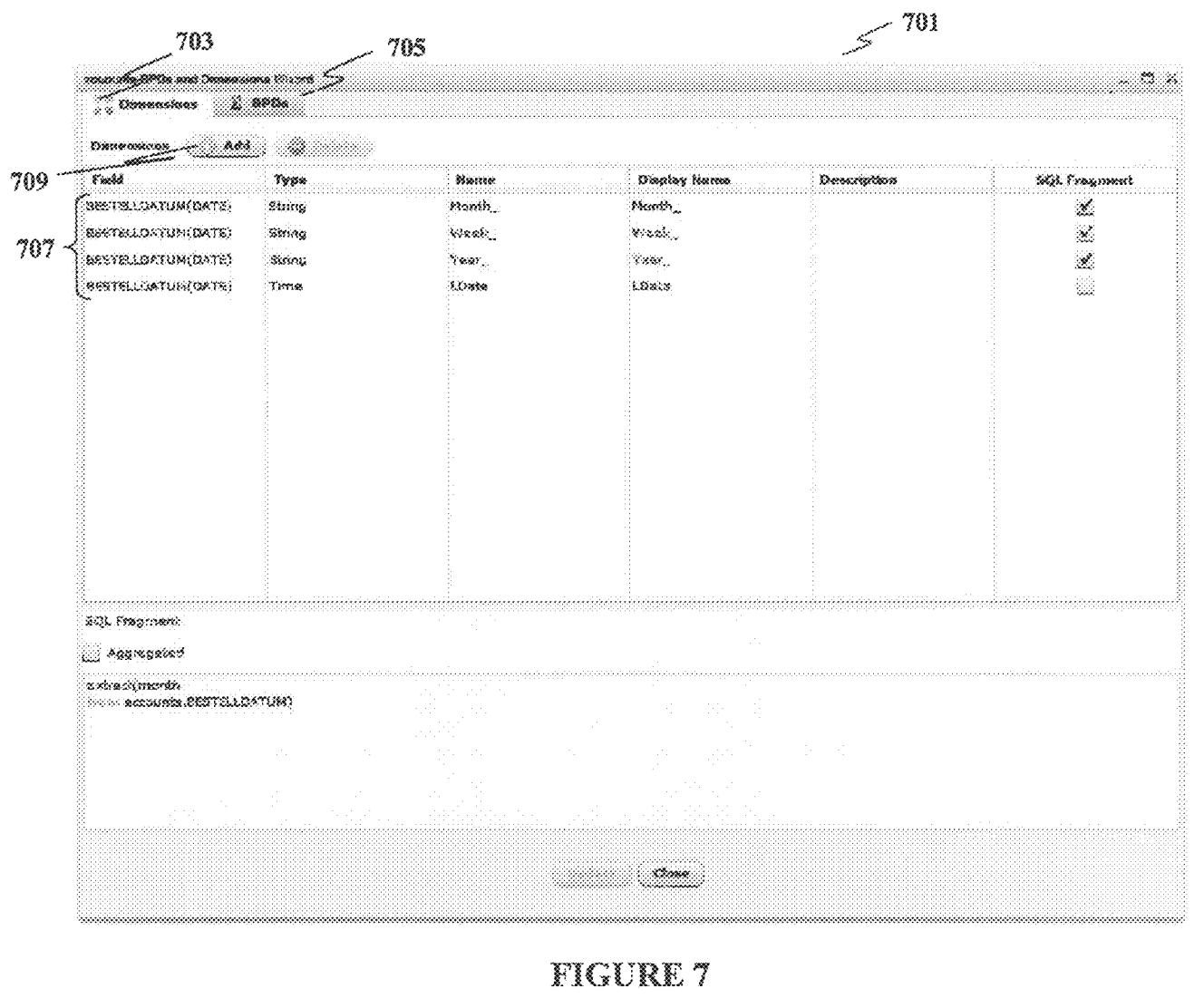

FIG. 7 shows a screen shot of the BPD and Dimensions wizard 701. The user is able to select from two tabs 703 and 705 depending on whether they wish to perform tasks relating to Dimensions (tab 703) or BPDs (tab 705). As shown in FIG. 7 the Dimensions tab has been selected, and a list 707 of Dimensions associated with the selected table is displayed.

Figure 8:
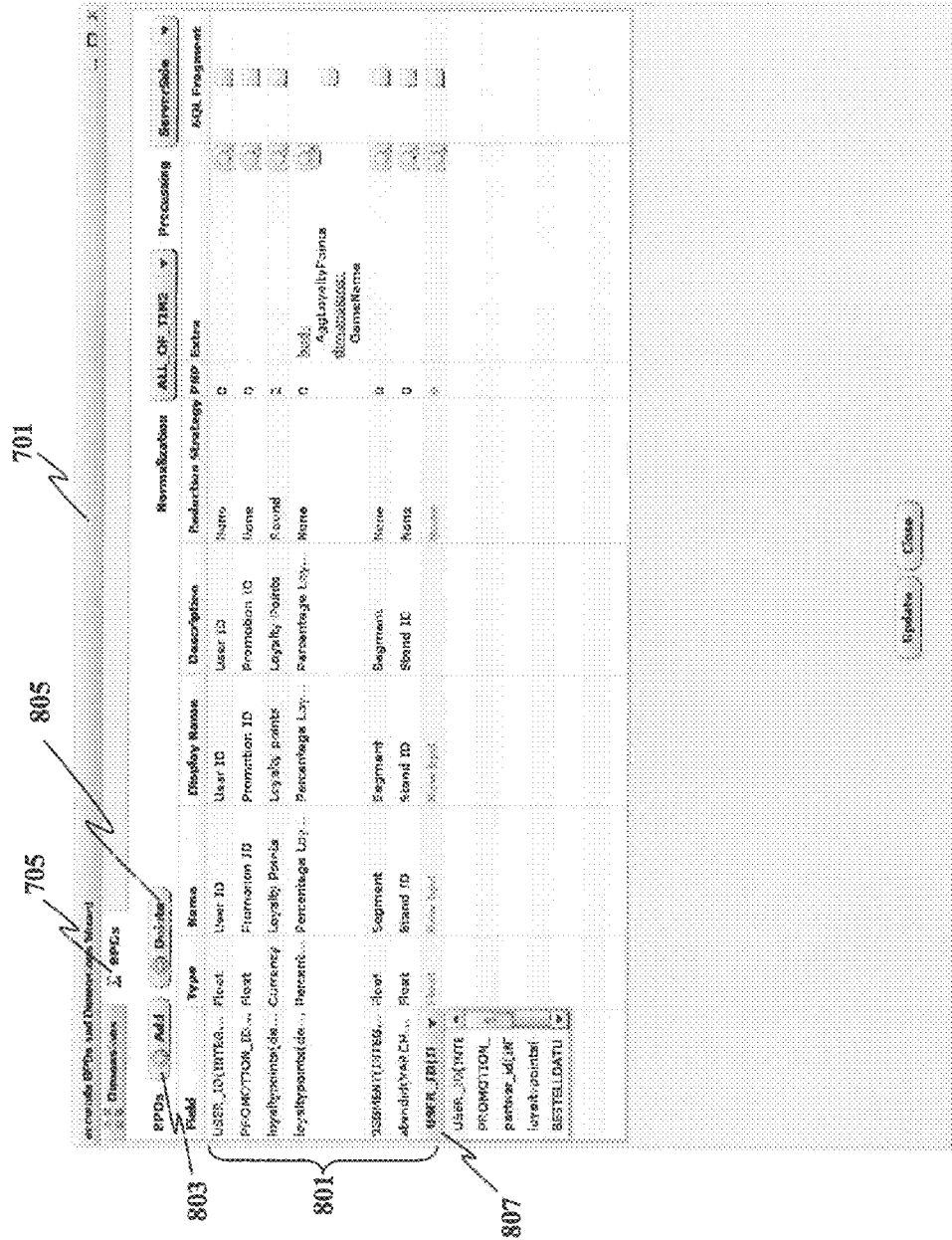

FIG. 8 shows a screen shot of the BPD and dimension wizard with the BPD tab 705 selected by the user. A list 801 of BPDs associated with the selected table is displayed. Upon a user selecting the "Add" button 803, a new BPD is created.

If the user selects a BPD in the list and subsequently selects the "Delete" button 805, that selected BPD is removed from the list and is no longer associated with the table.

The screen shot in FIG. 8 shows the state of the user interface display of the configuration system after a user has selected the "Add" button 803. A new BPD line 807 is created. The user is then able to run through and select the different options for the newly created BPD metric record under each of the headings: Field, Type, Name, Display name, Description, Reduction Strategy, PNP, Extra and SQL Fragment. Once these parameter options have been selected by the user, the "Update" button may be selected to update the parameters of the new BPD metric record.

The following describes the parameter options available to a user when creating a new BPD data record.

Clicking the field column in the BPD and Dimension wizard displays a list of available fields within that table that the BPD relates to. The user selects which of these fields the BPD is associated with.

Clicking within the type column displays a list of available types that define the BPD. The default type is float. The following provides a description of each of the different type options that are available:

INTEGER: This option defines a BPD that is derived from a data warehouse field containing a signed 31 bit integer.

FLOAT: This option is the default type for the BPD. This option defines a BPD that is derived from a data warehouse field containing a single or double precision floating point number.

CURRENCY: This option defines a BPD that is derived from a data warehouse containing a financial value.

AGGREGATED: An aggregated BPD references a BPD and will be used in the SQL generation process to create a query that calculates aggregate values for the referenced BPD (for example, average, sum, count, minimum, maximum).

PERCENTAGE: This option defines a BPD that represents the result of calculating the percentage for the referenced BPD value in a defined period of time.

TOP X BPD: This type references a BPD that will be used in the SQL generation process to create a query that returns a result set limited to the first 'x' (number) of rows.

Next, the user selects a name for the BPD. This is the BPD name within the system and must be unique.

A display name is then chosen and entered. This is the name that is displayed within the system and must be unique.

A description is provided. This is the BPD description within the system.

A reduction strategy is then selected by the user. By clicking within the reduction strategy column a list of available reduction strategies to be applied to the BPD are displayed. The available reduction strategy options are as follows:

NONE: This is the default reduction strategy. It does not perform any reduction strategies to a given value (e.g. a number is displayed as it appears in the database).

ROUND: This rounds the given value by the Precision Number of Places (PNP) entered.

TRUNCATE: This truncates the given value to the Precision Number of Places entered.

Next, the user selects the PNP—Precision Number of Places. This is the Precision Number of Places to be applied to the reduction strategy. The user clicks within the Precision Number of Places field and updates as appropriate. The default Precision Number of Places is zero ('0').

The user may then enter the required normalization parameter by updating the normalization field if required. The available normalization options are as follows:

DISCRETE: This specifies that data is time based and not aggregated. Grouping can be used to aggregate discrete data, but since the granularity of the discrete data cannot be assumed, this normalization unit value cannot be a conversion target.

DAILYCHRON: This specifies data that is normalized into 24 hour aggregates on Chronological day boundaries (Midnight).

HOURLY: This specifies data that is normalized into hourly record aggregates on Hour Boundaries.

WEEKLY: This specifies data that is normalized into weekly aggregates (ISO8601 Week Boundaries).

MONTHLY: This specifies data that is normalized into monthly aggregates.

YEARLY: This specifies data that is normalized into yearly aggregates (Western Calendar Year Boundaries—Midnight on 1 January, depending on the organizations definition of Business Hours).

ALL_OF_TIME: This specifies data that is not time based. An example would be a look-up table such as a State Name Lookup Table.

The user may then select the required processing parameters as follows:

CLIENTSIDE: This parameter enables processing to be carried out on the Client.

SERVERSIDE: This option enables the processing to be carried out on the Server.

MIXED: This option means that the listed BPDs or Dimensions contain both ClientSide and ServerSide options. Each individual BPD or Dimension may be viewed to see the actual processing option that has been applied.

Some BPDs may require further information to make the BPD complete. For example, SI unit formatting may be applied such as OFF; SMART; KILO; MEGA; GIGA; TERA; MILLI; MICRO; PICO.

The following describes the parameter options available to a user when creating a new Dimension data record.

When the Dimension tab is selected in the BPD and Dimension wizard, the user may adjust the parameters of the Dimension. Clicking the field column in the BPD and Dimension wizard causes a list of available fields within that table that the Dimension relates to. The user selects which of these fields the Dimension is associated with.

Clicking within the type column displays a list of available types that define the Dimension. The following provides a description of each of the different type options that are available:

INTEGER: Defines a Dimension that is derived from a data warehouse field containing a signed 31 bit integer.

FLOAT: Defines a Dimension that is derived from a data warehouse field containing a single or double precision floating point number.

CURRENCY: Defines a Dimension that is derived from a data warehouse containing a financial value.

STRING: Defines a Dimension associated with a string field in a table.

TIME: Defines a Dimension associated with a date/time field in a table.

POINT: Defines a Dimension associated with a well known text data of type point.

POLYGON: Defines a Dimension associated with a well known text data of type multi-polygon and polygon.

LINE: Defines a Dimension associated with a well known text data of type multi-string and line-string.

GEOMETRY: Defines a Dimension that provides a generic way of handling well known text objects.

The user may then select a name for the Dimension. This is the Dimension name within the system and must be unique.

The user may then select a display name for the Dimension. This is the name that is displayed within the system and must be unique.

A description may then be entered by the user. This is the Dimension description within the system.

The user may then indicate whether the Dimension is associated with an SQL fragment.

When setting up a new visual document, a list of available BPDs associated with the visual document type are provided to the user via the user interface. When the user selects which BPDs they wish to use from the list, proxy BPD metric records are created. That is, records that represent the original BPD metric but are distinct from the original (e.g. parent) BPD metric are created. These proxy BPD records are associated with the visual document in which they are created. By creating a proxy record, the integrity of the parent data record remains intact and the proxy record can be maintained within the visual document in which it was created.

That is, the system includes a number of stored parent or base BPDs associated with each visual document template.

These parent BPD metric objects form the basis for all future BPDs. Upon selecting the relevant BPDs, a duplicate version of the associated parent BPD is created and stored as a proxy within the newly created visual document.

The proxy BPD is directly linked to the parent BPD until the proxy BPD is modified. That is, when the proxy BPD is used in a visualization document, the unmodified proxy BPD merely refers to the parent BPD. The direct link enables a large number of unmodified proxy BPDs to be altered by applying one or more changes to the associated parent BPD.

Upon the proxy BPD being directly modified so that it is no longer the same as the parent, the direct link between the proxy and parent is broken so that the proxy BPD no longer refers to the parent but instead becomes a standalone BPD metric record. That is, when the proxy BPD is selected for use in a visualization document, the actual proxy BPD metric record is used by the visualization system.

The same process described above in relation to proxy BPD records occurs when a user requests that a Dimension data record is applied to a visual document and so creates a proxy Dimension data record. For example, referring back to FIG. 7, if the user were to select the "Add" button 709, a similar process to that described above would create a proxy Dimension data record that refers to a parent Dimension data record until the proxy Dimension data record is modified. It will be understood that the parameter options available to a user when creating a new Dimension record are different to those available when creating a new BPD record. That is, the Dimension record has the following parameter options that can be modified by a user: Field, Type, Name, Display Name, Description and SQL Fragment.

Therefore, whenever a new modifiable data interface object is formed (due to selection when creating a visual document, for example), whether it is a new BPD metric record or a Dimension data record, the proxy process as described above is applied.

Figure 9A:
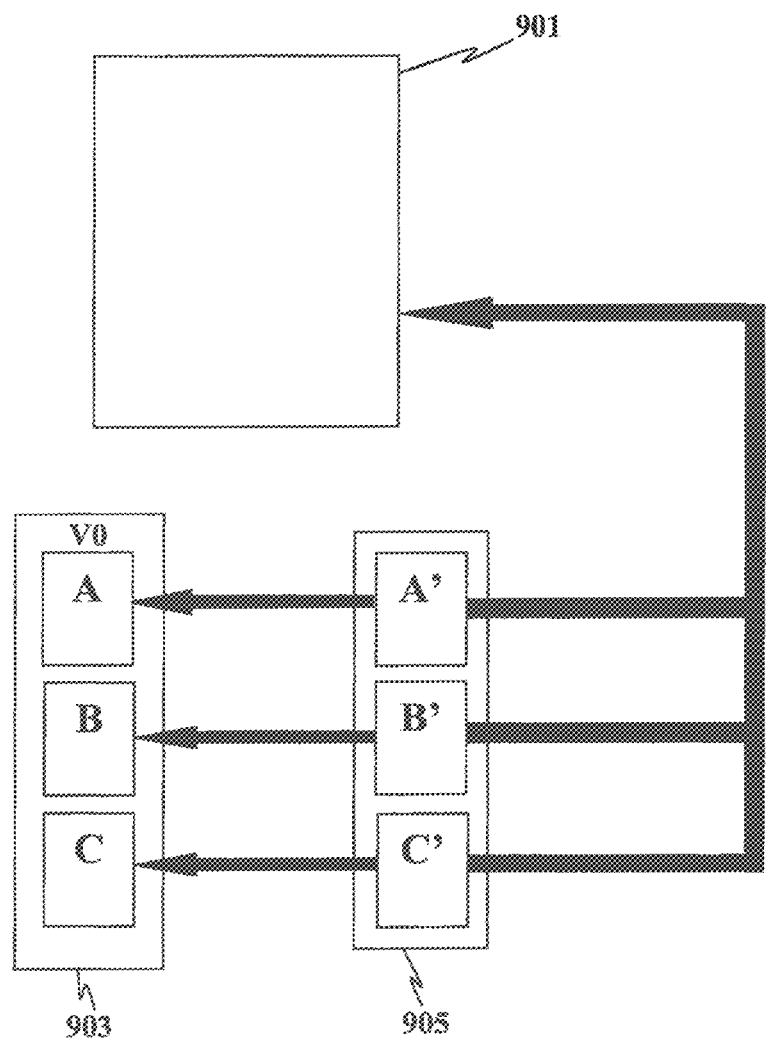
FIG. 9A shows a conceptual diagram showing proxy modifiable data interface objects according to an embodiment of the present invention.

FIG. 9A shows a conceptual diagram that explains the relationship between proxy modifiable data interface objects, such as a BPD and/or Dimension records, and their parent modifiable data interface objects when a new visualization document is created.

A visualization document 901 is created by the user selecting an appropriate visualization document template via the user interface. Upon selecting the required template, the user is provided with a list of relevant parent modifiable data interface objects 903, which include BPD metric records and Dimension data records that are associated with the selected template. The user selects which of these records they want to use within their visualization document. Upon selecting the required data records for a visual document, proxy modifiable data interface objects 905, including proxy modifiable metric records (proxy BPD records) and proxy modifiable data records (proxy Dimension records) are created, as explained above. Each of these proxy objects (A', B', C') refer back or are linked to an associated parent object (A, B, C). It is assumed at this stage that all the parent modifiable data interface objects are unchanged since being created and are so at Version 0. However, it will be understood that the parent modifiable data interface objects may have been updated prior to the visualization document being created and so may be an updated version. When the Visualization document is being rendered by the visualization computing system, the data records (BPDs and Dimensions) that are retrieved are based on the proxy modifiable data records 905, which refer to the parent records 903.

Figure 9B:
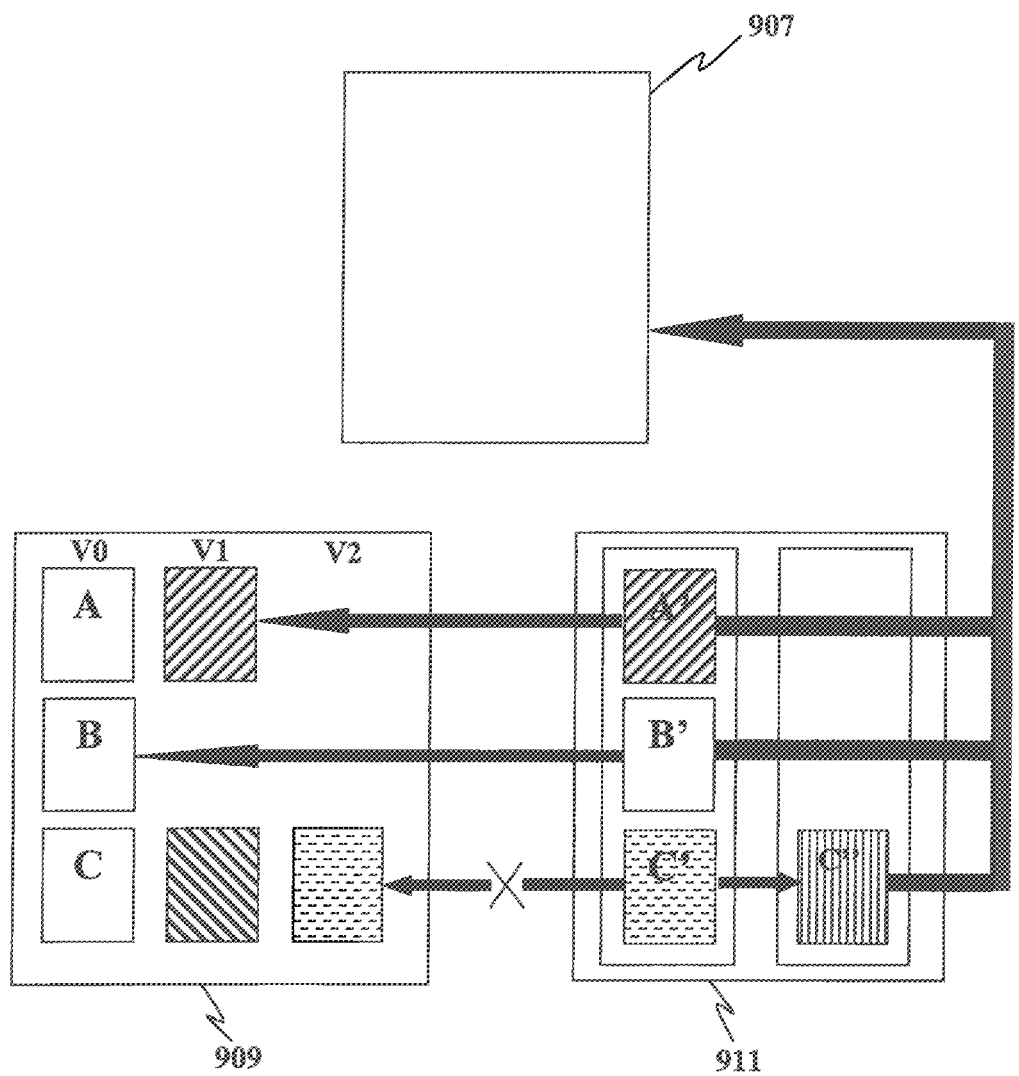
FIG. 9B shows a further conceptual diagram showing proxy modifiable data interface objects according to an embodiment of the present invention.

FIG. 9B shows an existing visualization document 907 that was previously created by the user. A number of parent modifiable data interface objects 909 are associated with the visualization document. Some of the parent data interface objects have been updated.

A number of proxy modifiable data interface objects 911 created when the visualization document was created refer back to the original parent data objects. This is because, as explained above, the proxy objects have not been modified. For example, the proxy object A' refers back to the version 1 parent object A. The proxy object B' refers back to the version 0 parent object B.

For example, parent object A was updated from version 0 to version 1, and so before this update, the proxy object A' referred back to parent data object version 0. After the change to the parent object A, the proxy object A' refers back to parent data object version 1.

The representation in FIG. 9B shows that proxy object C' once referred back to version 2 of parent object C until the user modified the proxy object C' making it into a new data object C". This new data object C" no longer refers back to the parent object C and is independent of the parent object C. Any changes made to the parent object C do not affect the new object C". The proxy object C' is no longer in existence due to it being modified.

Therefore, when the Visualization document 907 is being rendered by the visualization computing system, the data records (BPDs and Dimensions) that are retrieved are based on the proxy modifiable data records 911 as well as any modified proxy modifiable data records, such as C".

If a user decides to add a further data object (BPD or Dimension record) to the visualization document 907, a new proxy data record and relationship with a parent data record is created in the same way as the relationship between the parent data record B and proxy data record B'. This relationship remains until the proxy data record is modified, after which, the proxy data record becomes independent of the parent data record.

The key to understanding the data interface layer is that the BPDs and Dimensions are defined as a layer between the super graphic of the visualization and the data to provide a level of isolation and independence between the super graphic and the data being represented in the super graphic. This means that interface objects that are configured to use the BPDs and Dimensions are not aware of the implementation of the data query. This independence simplifies the configuration of the super graphic.

The data visualization configuration system enables the person configuring (an expert in building queries) to ensure the visualization system is easy to use by the end user without the end user running into problems with the data being analysed.

The data visualization configuration system enables a configurer to easily assign BPD and dimension values to create visualizations. That is, the configurer can use the data visualization configuration system to define what the visualization is and also what the end user can do when interacting with the visualization.

This is accomplished by enabling the user of the data visualization configuration system to configure data objects that are independent of the implementation of the actual data. This isolation of the visual document from the complexity of the structure of the data greatly simplifies the configuration.

The configurer defines the complex interaction that will ensure the end user will not run into problems by visualising incorrect data. That is, the configurer is given the tools to ensure only sensible data values can be used for the BPD and dimensions. By providing an intelligent layer between the configuration of the visual document and the construction of the query the end user is greatly shielded from the complexity of the data and is unlikely to make mistakes in configuration. Simply put the configuration is isolated from the data.

When creating a BPD, the configurer is provided the tools to select the measures and dimensions that are used to restrict the BPD data (these measures/dimensions are known as BPD restrictables). A sensible or logical set of restrictables can be generated from a set of predefined rules available to the data visualization system or may be generated through direct configuration by the user of the data visualization configuration system.

Also, when creating a BPD, the configurer is provided the tools to select suitable and appropriate measures/dimensions that the end user can use in a heatmap (BPD heatmappables). Again a sensible or logical set of restrictables can be generated from a set of predefined rules available to the data visualization configuration system or may be generated through direct configuration by the user of the data visualization configuration system.

Further, the configurer can define suitable data values that can be used to restrict a new dimension (dimension restrictables). The data visualization configuration system provides assistance with this by providing guidance on related dimensions or measures the final consumer of the super graphic can select from. That is, a subset of dimensions or measures is provided to the user based on a set of pre-defined rules. These sub set of dimensions or measures is based on the underlying understanding of the structure of the data that the data visualization configuration system interfaces to.

When configuring any system it is up to the person configuring to select the most appropriate options from the available list to enable the system to work effectively. Therefore, it is up to the configurer to select the items from the list OR for the configurer to define the list that is available to other users. This differs from the generation of a super graphic as it does not define the generation of the super graphic but the parameters that are included in the super graphic for additional renderings that the final end user of the super graphic may request.

Another feature is the data visualization configuration system's ability to understand how to write SQL for multiple database engines. Therefore, once the data visualization configuration system has been used by the configurer it is able to create visual documents using data from a number of different database engines without the user or configurer having to specifically create separate SQL queries for each engine.

Accordingly, the system performs a method of creating multiple database queries for retrieving data from a plurality of differently configured databases. This method comprises one or more of the following steps.

The system receives instructions so that it can create a graphical representation of data from a plurality of databases. It then identifies from which of the databases the data is to be retrieved. The system then creates a plurality of database queries based on the instructions and the identified databases.

For example, each database query may be configured to enable the data required for the graphical representation to be retrieved from the database query's associated database.

Further, the method may include one or more of the following steps. The system may identify a specific database configuration for each of the plurality of databases identified, identify a set of rules associated with each of the identified configurations, and then create a database query based on each of the set of rules identified.

Optionally, the step of identifying the specific database configuration may include one or more of the following steps. The system may request configuration data from the database, receive the configuration data in response to the request, and identify the database configuration based on the received configuration data.

Optionally, the step of identifying the set of rules may include one or more of the following steps. The system may request configuration data from the database, receive the configuration data in response to the request, and identify the set of rules based on the received configuration data.

The step of creating a database query may include one or more of the following steps. The system may load the identified set of rules into a SQL engine, and create SQL statements in line with the identified database configuration based on the loaded rules and received instructions.

A further feature of the data visualization configuration system is the layering of the measure definitions. That is, a measure may refer to another measure.

For example, measure X may be the average value associated with measure T. These measures may then be stacked in a hierarchy. The SQL engine is then able to understand how to put the measures together based on the hierarchy and the child parent relationship between the measures.

Therefore, the data visualization configuration system may include a method of organising measures in a data visualization system. This method may include one or more of the following steps. The system may associate a first measure with at least one further measure, where the association is based on a mathematical or statistical relationship between the first and further measure. The system may then arrange the first and further measures in a hierarchy based on the relationship. The system may then provide an SQL engine with details of the hierarchy to enable the SQL engine to understand the relationship between each measure in the hierarchy.

The relationship upon which the associated measures are based may determine an order of priority in which the associated measures are to be determined.

Further, the processing of the associated measures may be ordered based on the hierarchical relationship of the associated measures.

Further, the processing may be ordered by processing associated measures that are higher in the hierarchy before associated measures that are lower in the hierarchy.

Other optional features of the data visualization configuration system include:
  A drag and drop function for adding new BPDs and dimensions,
  A single button click enables the removal of BPDs and dimensions that are no longer required
  Joins in data tables are easily created
  Flag icons are produced and displayed to indicate the status of a visual design. For example, the status may be: in process of rendering; completed rendering; failed to render. Further, details of any failed renderings are provided to enable the user to determine the reason why the rendering failed.

It will be understood that the embodiments of the present invention described herein are by way of example only, and that various changes and modifications may be made without departing from the scope of invention.

The invention claimed is:

1. In a data visualization system including a data visualization configuration system, a method of creating one or more modifiable database interface objects that are used to represent data values for visualization in a graphical representation, the method comprising the steps of:
    creating one or more modifiable database interface objects that are used to access data values for visualization of the data values in the graphical representation;
    detecting an instruction to create a new modifiable database interface object from a list of parent modifiable database interface objects,
    creating a proxy modifiable database interface object as the new modifiable database interface object for each parent modifiable database interface object associated with the instruction;
    enabling the proxy modifiable database interface object to be available for modification, where the proxy modifiable database interface object refers to its associated parent modifiable database interface object; and
    utilizing a least one proxy modifiable database interface object to obtain data, wherein the data obtained is used to form at least part of the graphical representation of the data in the data visualization system.

2. The method of claim 1, wherein the modifiable database interface object is one of a modifiable metric record and a modifiable dimension record.

3. The method of claim 1, wherein the proxy modifiable database interface object refers to its associated parent modifiable database interface object when the proxy modifiable database interface object is not modified.

4. The method of claim 3, wherein when the parent modifiable database interface object is updated, the same updates are applied to the proxy modifiable database interface object.

5. The method of claim 1, wherein the proxy modifiable database interface object is used when forming at least part of the graphical visualization.

6. The method of claim 1, wherein the proxy modifiable database interface object no longer refers to its associated parent modifiable database interface object when the proxy modifiable database interface object is modified.

7. The method of claim 1, wherein the step of detecting an instruction to create a new modifiable database interface object comprises the steps of:
    detecting an instruction to create a new graphical representation,
    retrieving a list of parent modifiable database interface objects associated with the new graphical representation, and
    detecting a selection of one or more of the parent modifiable database interface objects that are associated with the new graphical representation.

8. The method of claim 1, wherein the step of detecting an instruction to create a new modifiable database interface object comprises the steps of:
    detecting an instruction to create a new modifiable database interface object within an existing graphical representation,
    retrieving a list of parent modifiable database interface objects associated with the existing graphical representation, and
    detecting a selection of one or more of the parent modifiable database interface objects that are associated with the existing graphical representation.

9. The method of claim 1 further comprising the steps of detecting an instruction to modify an existing modifiable database interface object,
    retrieving the existing modifiable database interface object,
    enabling the retrieved existing modifiable database interface object to be modified, and
    saving the modified existing modifiable database interface object as the proxy modifiable database interface object.

10. The method of claim 1, wherein the step of detecting an instruction comprises the steps of detecting a selection of a table in a database and detecting an instruction to create the new modifiable database interface object based on the selected table.

11. The method of claim 1, further comprising the step of retrieving data values for representation in the graphical representation from a database retrieval module in communication with the data visualisation configuration system, wherein the data values retrieved are associated with the proxy modifiable database interface object.

12. The method of claim 1, further comprising the step of applying the proxy modifiable database interface object to the graphical representation.

13. A data visualization computing system including a data visualization computing configuration system adapted to create one or more modifiable database interface objects that are used to represent data values for visualization in a graphical representation, the data visualization computing configuration system comprising:
    a processor;
    a memory device;
    a display device;
    a database interface object module executable by the processor arranged to:
        detect an instruction to create a new modifiable database interface object from a list of parent modifiable database interface objects,
        create a proxy modifiable database interface object as the new modifiable database interface object for each parent modifiable database interface object associated with the instruction;
        enable the proxy modifiable database interface object to be available for modification, where the proxy modifiable database interface object refers to its associated parent modifiable database interface object; and
        utilize a least one proxy modifiable database interface object to obtain data, wherein the data obtained is used to form at least part of the graphical representation of the data in the data visualization system.

14. The system of claim 13, wherein the modifiable database interface object is one of a modifiable metric record and a modifiable dimension record.

15. The system of claim 13, wherein the database interface object module is further arranged to cause the proxy modifiable database interface object to refer to its associated parent modifiable database interface object when the proxy modifiable database interface object is not modified.

16. The system of claim 15, wherein when the parent modifiable database interface object is updated, the database interface object module is arranged to apply the same updates to the proxy modifiable database interface object.

17. The system of claim 13, wherein the proxy modifiable database interface object is used when forming at least part of the graphical visualization.

18. The system of claim 13, wherein the proxy modifiable database interface object no longer refers to its associated parent modifiable database interface object when the proxy modifiable database interface object is modified.

19. The system of claim 13, wherein during the detection of an instruction to create a new modifiable database interface object, the database interface object module is further arranged to:
   detect an instruction to create a new graphical representation,
   retrieve a list of parent modifiable database interface objects associated with the new graphical representation, and
   detect a selection of one or more of the parent modifiable database interface objects that are associated with the new graphical representation.

20. The system of claim 13, wherein during the detection of an instruction to create a new modifiable database interface object, the database interface object module is further arranged to:
   detect an instruction to create a new modifiable database interface object within an existing graphical representation,
   retrieve a list of parent modifiable database interface objects associated with the existing graphical representation, and
   detect a selection of one or more of the parent modifiable database interface objects that are associated with the existing graphical representation.

21. The system of claim 13 wherein the database interface object module is further arranged to detect an instruction to modify an existing modifiable database interface object,
   retrieve the existing modifiable database interface object,
   enable the retrieved existing modifiable database interface object to be modified, and
   save the modified existing modifiable database interface object as the proxy modifiable database interface object.

22. The system of claim 13, wherein during the detection of an instruction the database interface object module is further arranged to detect a selection of a table in a database and detect an instruction to create the new modifiable database interface object based on the selected table.

23. The system of claim 13, wherein the data visualization configuration system is arranged to retrieve data values for representation in the graphical representation from a database retrieval module in communication with the data visualisation configuration system, wherein the data values retrieved are associated with the proxy modifiable database interface object.

24. The system of claim 13, wherein the data visualization configuration system is further arranged to apply the proxy modifiable database interface object to the graphical representation.

* * * * *